United States Patent
Hauke et al.

(10) Patent No.: US 7,606,395 B2
(45) Date of Patent: Oct. 20, 2009

(54) METHOD AND ARRANGEMENT FOR OPTICAL RECORDING OF DATA

(75) Inventors: Rudolf Hauke, Niederstotzingen (DE);
Giuseppe Parziale, Grottaglie (IT);
Gerhard Paar, Graz (AT);
Peter-Michael Merbach, Zella-Mehlis (DE)

(73) Assignee: TBS Holding AG, Pfaeffikon (CH)

( * ) Notice: Subject to any disclaimer, the term of this patent is extended or adjusted under 35 U.S.C. 154(b) by 979 days.

(21) Appl. No.: 10/515,102

(22) PCT Filed: Aug. 28, 2004

(86) PCT No.: PCT/DE2004/002026

§ 371 (c)(1),
(2), (4) Date: Nov. 19, 2004

(87) PCT Pub. No.: WO2006/021165

PCT Pub. Date: Mar. 2, 2006

(65) Prior Publication Data

US 2006/0045316 A1    Mar. 2, 2006

(30) Foreign Application Priority Data

Aug. 25, 2004    (WO) ............... PCT/DE2004/001886

(51) Int. Cl.
*G06K 9/00*    (2006.01)
(52) U.S. Cl. ..................................... 382/115; 382/116
(58) Field of Classification Search ................ 382/115, 382/116, 154, 209
See application file for complete search history.

(56) References Cited

U.S. PATENT DOCUMENTS

| | | | | |
|---|---|---|---|---|
| 5,801,763 A | * | 9/1998 | Suzuki | 348/77 |
| 5,963,664 A | | 10/1999 | Kumar et al. | |
| 6,125,197 A | * | 9/2000 | Mack et al. | 382/154 |
| 6,195,455 B1 | * | 2/2001 | Mack et al. | 382/154 |
| 6,377,700 B1 | * | 4/2002 | Mack et al. | 382/154 |
| 6,404,904 B1 | | 6/2002 | Einighammer et al. | 382/124 |
| 6,434,278 B1 | * | 8/2002 | Hashimoto | 382/285 |
| 6,466,686 B2 | | 10/2002 | Senior | |

(Continued)

FOREIGN PATENT DOCUMENTS

DE    3424955    1/1986

(Continued)

OTHER PUBLICATIONS

David Zhang et al: "Integrated Image and Graphics Technologies", XP-002390949. Chapter 8, p. 142.

(Continued)

*Primary Examiner*—Charles Kim
*Assistant Examiner*—Stephen R Koziol
(74) *Attorney, Agent, or Firm*—Darby & Darby

(57) ABSTRACT

The invention relates to a method and a system for recording biometric data, especially for recording the features of the fingers or faces of persons, wherein an object is recorded by optically scanning it and evaluated by digital image processing. The inventive method is characterized in that the object is recorded simultaneously or almost simultaneously by at least two different recording devices, whereby all pixels of the surface to be imaged are imaged in at least two different directions in at least one digital two-dimensional image each and a three-dimensional model of the viewed object is calculated from at least two images.

11 Claims, 6 Drawing Sheets

U.S. PATENT DOCUMENTS

| | | | |
|---|---|---|---|
| 6,980,690 B1 * | 12/2005 | Taylor et al. | 382/154 |
| 7,139,424 B2 | 11/2006 | Sogawa et al. | |
| 2001/0038705 A1 * | 11/2001 | Rubbert et al. | 382/128 |
| 2004/0008875 A1 | 1/2004 | Linares | 382/124 |

FOREIGN PATENT DOCUMENTS

| | | |
|---|---|---|
| DE | 195 16 662 | 11/1996 |
| DE | 101 23 561 | 10/2001 |
| DE | 101 03 622 | 8/2002 |
| DE | 101 53 808 | 5/2003 |
| EP | 1 073 988 | 2/2001 |
| WO | 99/56267 | 11/1999 |
| WO | WO-0209024 | 1/2002 |

OTHER PUBLICATIONS

M.M. Oliveira et al.: "Relief Texture Mapping", XP-001003575, 2000 Siggraph, Computer Graphics Proceedings, Annual Conference Series, 2000, pp. 359-368.

M.Rioux: "Color 3-D Electronic Imaging of the Surface of the Human Body", Autonomous Systems Laboratory, Institute for Information Technology, National Research Council Canada, Ottawa. Canada K1A 0R6, SPIE vol. 2277, pp. 42-54.

Co-pending U.S. Appl. No. 11/209,604, entitled "Method and arrangement for optical recording of biometric finger data".

* cited by examiner

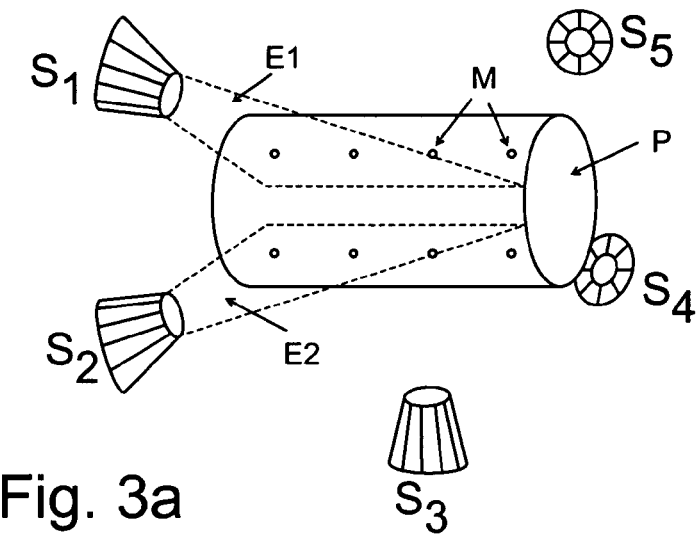
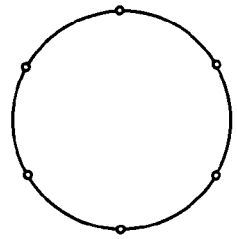
Fig. 3a
Fig. 3b
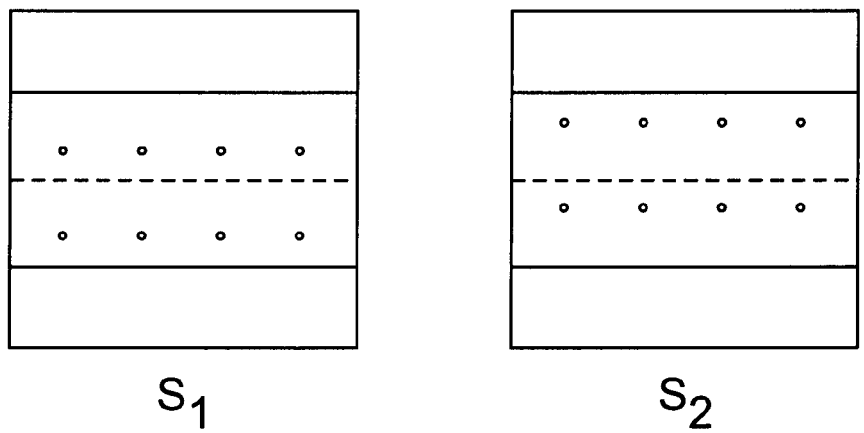
Fig. 4
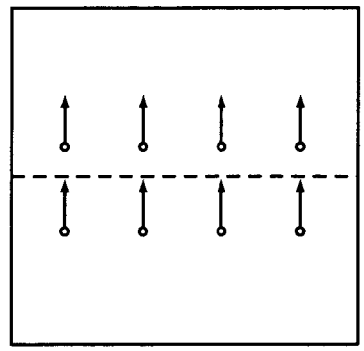
Fig. 5

A - A'

A - A'

METHOD AND ARRANGEMENT FOR OPTICAL RECORDING OF DATA

The present invention relates to a method and an arrangement for acquiring biometric data, particularly for acquiring finger or face characteristics of persons, where an object is acquired by optical scanning and analyzed by digital image processing.

BACKGROUND

Internationally, the usage of so-called biometric characteristics is postulated increasingly, for example in the US-visit and European programs.

Am aim of these programs is to increase the security, for example for airline passengers, and to recognize terrorists as early as possible.

For the acquisition of the biometric data, characteristics of the face, of the iris and of the finger are used preferably. Because of the high recognition rate and the invariability of the characteristics during the process of aging and because of the distinguishability even for uniovular twins, the characteristics of the finger are especially suited.

Especially for surveillance of persons at a border crossing, the biometric characteristics of a person demanding admittance have to be matched with existing, very large databases which can contain many millions of entries. In doing so, it has to be ensured that the biometric data being deposited in a fraud resistant way on a passport is in accordance with the entering person. As these characteristics have to be identified in a so-called 1:N search out of millions of comparison informations, in particular of criminal search databases, in case of finger characteristics a recognition problem of the following type arises:

The smaller the scanned surface of the finger which is to be identified the more inaccurate the results of the 1:N search are, because the number of characteristics, so-called minutiae, are not sufficient for a definite identification. Studies have shown that recognition methods using finger sensors which give only a simple impression of the finger reach a recognition rate of 80% to 85% only, because of the not entirely acquired finger surface. Such methods which are called flat finger impressions are predominantly used in civil areas. For protection against crime, a recognition rate that low is insufficient.

Due to this, unrolled fingerprints have always been used in official criminology, where the person to be registered has to dye the fingers first and to roll them onto paper to be able to reproduce the entire surface of the finger from nail to nail.

Newer methods are known, too, where so-called live-scanners are utilized which replace the intricate dyeing, wherein the finger is rolled across a glass plate and the contrast due to a disabled total reflection arising thereof is used for optically imaging by means of a camera. With this method, it is possible to significantly increase the recognition rate of the 1:N identification in large databases to more than 98%.

With this method it is disadvantageous that the person to be registered has to roll the finger on an underlay. Normally, this results in problems with unexperienced users, wherein the fingerprints become smeared. Additionally, because of the different application pressure the fingers can deform differently or yield bad contrasts. Furthermore, it has been observed that, besides of a lack of contrast, in particular in case of dry skin, grease marks are left which can also be recognized in a subsequent identification. To avoid this, the registration underlays consisting of glass have to be cleaned after each use as a general rule. Because a supervisor is required for an optimal accuracy, these methods cannot be used reasonably at automated control sites, for example so-called kiosks in the aforementioned entry programs.

Systems are known which enable to image a finger touchlessly.

For example, it is known from EP 1 073 988 B1 and WO 99/56267 respectively to image a finger touchlessly, wherein the formation of the contrast is based upon exploiting features of polarized light. Thereby, the insufficient light efficiency turns out to be disadvantageous, because the polarization filter prevents an effective usage of the photons and therefore the efficiency factor is low. Furthermore, distortions caused by the imaging process are not compensated and result in the recognition of wrong minutiae very often, which is caused by shadowing to the dermal ridges in the utilized optical path of illumination.

SUMMARY OF THE INVENTION

Based on the touchless imaging principle, several techniques are generally known where the unrolled finger, i. e. the surface, can be imaged user-friendly. Thereto, for example, DE 101 23 561 A1, DE 101 53 808 A1 and DE 101 03 622 A1 belong.

In DE 101 23 561 A1, a method for identification of persons by means of a three-dimensional analysis of the fingertip is described. However, no method is given to calculate the three-dimensional model and how to solve the problems of composing the single images to an overall image with sufficient accuracy.

If such a method is to be used for identification of persons at a country's borders, at least criteria for the imaging quality, for example FBI Appendix F or similar criteria, have to be fulfilled and it has to be ensured that the images taken from the dermal ridges are compatible with existing unrolled finger images. It is absolutely necessary to recognize persons on the basis of existing databases, in particular if these have been re-acquired with new optical methods.

In DE 101 03 622 A1, a method for imaging the surface of a finger is described, which reproduces the surface essentially by cylindrical imaging. However, it is disadvantageous that, on one hand, the finger is not illuminated uniformly due to the utilized principle and, on the other hand, that the imaging has very strong distortions, especially if the finger lies not exactly on the optical axis of the cylinder.

The DE 101 53 808 A1 describes another method for touchless optical creation of unrolled fingerprints, at which the image distortions shall be eliminated by creating a sequence of partial images whose overlapping areas are correlated as a structure of orientation by exploiting the pattern of capillary lines. Besides of the intricate realization of this arrangement, with such a method the demanded imaging quality is achievable not at all or only with largest efforts.

From US 2004/0008875 A1, a method for acquiring and processing of three-dimensional fingerprints is known, wherein a finger which is arranged in contact with a transparent plate is scanned by means of at least two lasers, wherein the lasers sway along the finger and a stereoscopic fingerprint image is created from overlapping scan lines and saved. The method exhibits all disadvantages of touching optical fingerprint methods. Additionally, because of the geometric arrangement of the finger on the plate, neither the entire surface of the finger nor the entire finger-ball, respectively, can be imaged. Thus, the recognition rate is low. An accurate imaging method is not given in the document.

In the prior art, stereoscopic methods are inherently known. In particular, the Locus method is known, by which height deviations of an imaged body in relation to a geometric model which has to be provided can be determined from stereo image pairs.

In order to create stereo image pairs it is also known to perform a Hierarchical-Feature-Vector-Matching (HFVM) using calculations in image space.

In order to calibrate stereoscopic imaging devices, a method is known by which to determine the contortions and distortions of a stereoscopic imaging arrangement using a specimen.

It is an object of the present invention to provide a method and an arrangement, by which the disadvantages of the known methods for recording and processing of fingerprints are avoided and which can reproduce user-friendly and reliably at least a finger-ball and enable an increased fraud resistance.

The present invention a method acquiring biometric data of an object. The method includes the step of: acquiring a first digital two-dimensional image of a first set of points on a surface of the object from a first taking direction using a first optical scanning sensor; acquiring a second digital two-dimensional image of the first set of points from a second taking direction using a second optical scanner at least approximately simultaneously with the acquiring of the first image; and calculating a three-dimensional model of the object using the first and second digital two-dimensional images. The present invention also provides an arrangement for acquiring biometric data of a body part positionable in the arrangement. The arrangement includes: a first sensor configured to touchlessly take digital two-dimensional images of a surface of the body part; a second sensor configured to touchlessly take digital two-dimensional images of a surface of the body part, wherein the first and second sensors are arranged around a system axis in an arc-shaped manner and wherein optical axes of the first and second sensors are essentially oriented toward the system axis.

Advantageous embodiments are given in the dependent claims.

In the solution according to the present invention, each point of the surface to be imaged is imaged to two different directions, wherein the surface to be imaged is not touched. This method enables the entire surface of a finger or a hand or another part of the body to be imaged without contaminations deposited by parts of the body compromising the recognition. Furthermore, by imaging to two different directions and thus taking images from two different perspectives, a high accuracy of the recognition is possible.

In an advantageous embodiment, the images are taken in at least two sensors at a time, preferably in all of them, simultaneously or approximately simultaneously. Thus, errors caused by a movement of the finger are minimized.

In a preferred embodiment, two images from different perspectives are calculationally converted to a three-dimensional reproduction of the surface to be imaged using a stereoscopic calculation.

BRIEF DESCRIPTION OF THE DRAWINGS

In the following, the present invention is further explained considering examples of embodiments. On this, it is shown by.

DETAILED DESCRIPTION

Figure 1A:
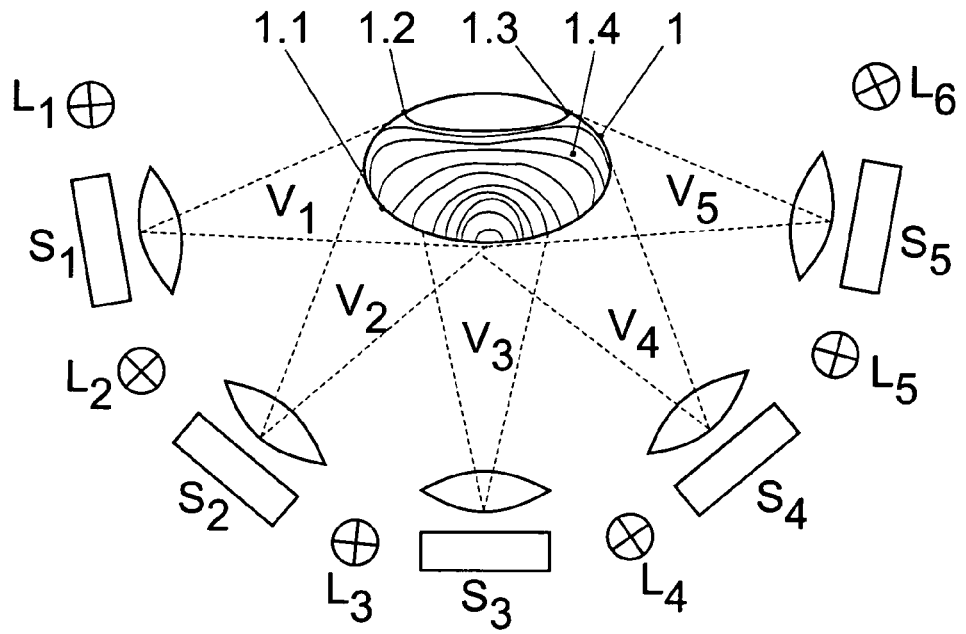
FIG. 1 a schematic representation of a finger in an arrangement according to the present invention, comprising five sensors and their fields of view in a front view with regard to the finger, FIG. 2 a schema of the method according to the present invention, FIG. 3 a schematic representation of an arrangement with a specimen in a parallel perspective view, FIG. 4 two images of the specimen in two adjacent sensors, FIG. 5 the stereo parallaxes of the images from FIG. 3 schematically, FIG. 6 a basic model of a finger, which is usable in the method, in a parallel perspective and a side view, FIG. 7 a sectional view of a three-dimensional model including the determined height deviations of a finger from the basic model, FIG. 8 a schematic representation of a grayscale image of the finger-ball being projected onto the three-dimensional model, FIG. 9 a schema of the further course of the method to compare acquired characteristics in two dimensions, FIG. 10 a schema of the further course of the method to compare acquired characteristics in three dimensions, FIG. 11 a schematic representation of the unrolling simulation of a projection of the finger-ball's surface onto a profile body, and FIG. 12 a fingerprint including the entire finger-ball up to the nail edges as a result of the method.
Figure 1B:
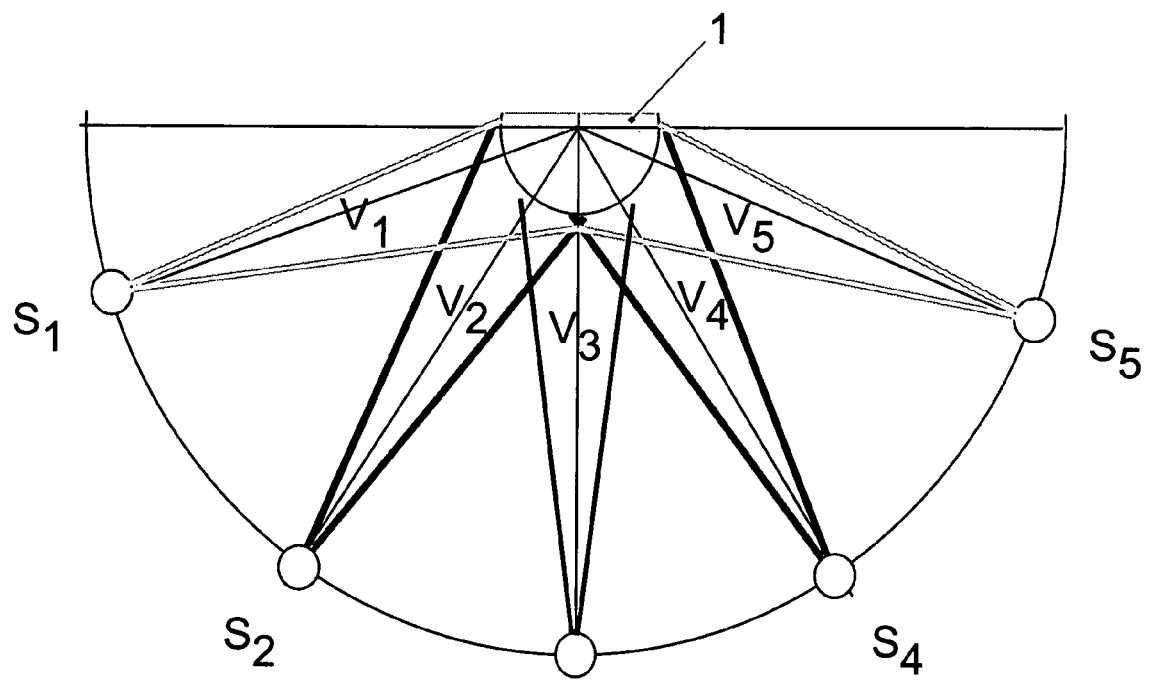

FIG. 1 shows in its partial figures a) and b) a finger as an object 1, which is held into an arrangement according to the present invention. The arrangement consists of five sensors $S_i$, (i=1 ... 5), which are arranged in an arc-shaped manner and focus a common point approximately on the middle axis of the finger. They are arranged on the arc in an angle of 36° to each other in relation to the middle axis of the finger. The sensors $S_i$ are imaging systems, but in FIG. 1 they are depicted merely in form of a CCD and a lens, respectively. However, CMOS or general image devices can be utilized. Of the surface of the finger, a surface to be imaged 1.1 which extends from one nail edge 1.2 to the other nail edge 1.3 across the finger-ball 1.4 shall be acquired. The fields of view $V_i$ of the sensors $S_i$ overlap each other. Thereby, each point of the surface to be imaged 1.1 is imaged by at least two sensors $S_i$ into, respectively, one two-dimensional stereo image 3. Between the sensors $S_i$, light sources $L_k$, (k=1 ... 6), are arranged, by which the object 1 and, particularly, the surface to be imaged 1.1 is illuminatable.

Figure 2:
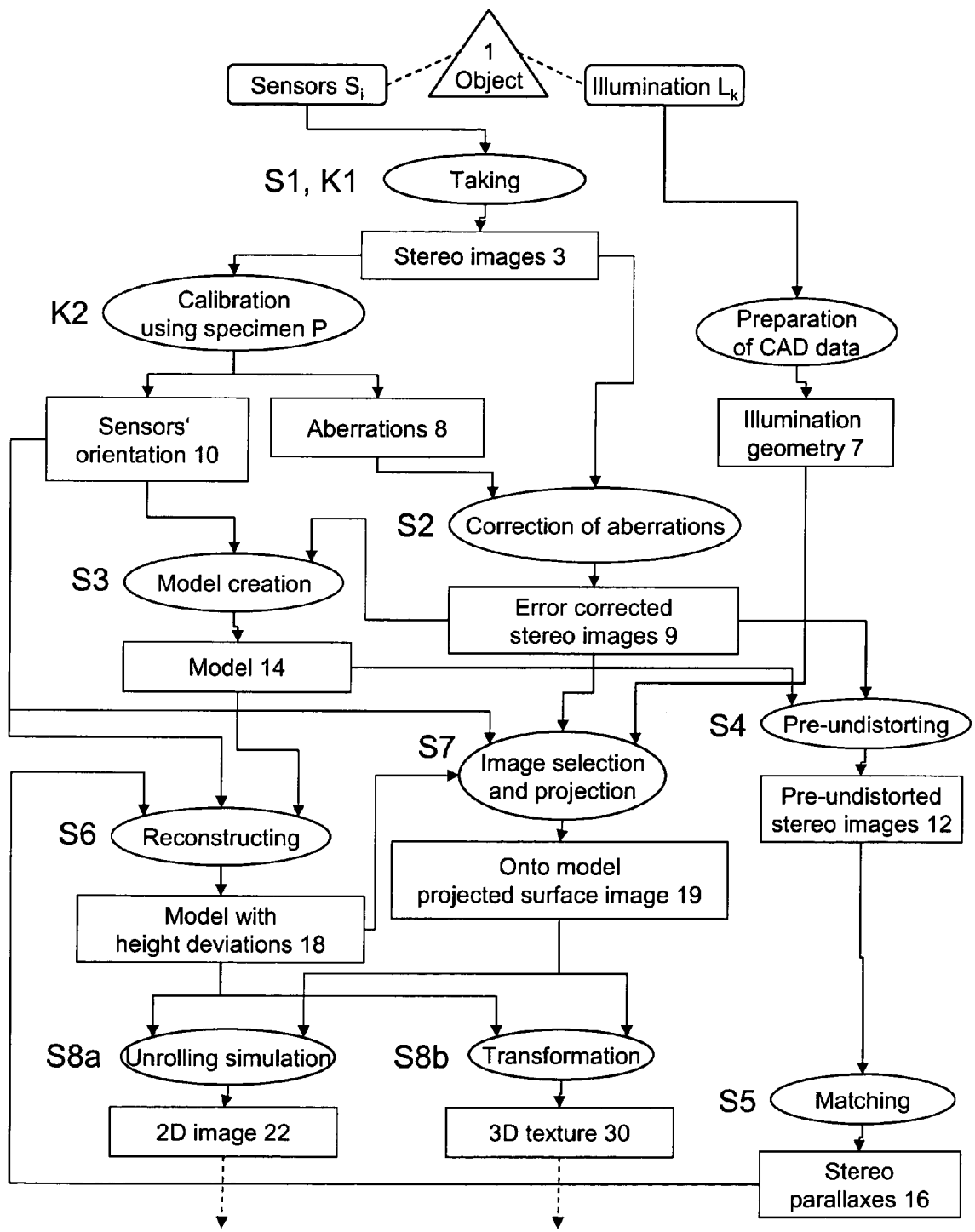

In FIG. 2, a schema of an embodiment of a method according to the present invention for acquiring biometric data is illustrated. Ellipsoidal elements represent a step of the method, rectangular elements are the result after a respective step of the method. Initially, in a step S1 or K1 respectively, the object 1 is imaged using the sensors $S_i$, wherein stereo images 3 are imaged by pairs in adjacent sensors $S_i$ and $S_{i+1}$, (t=1 ... 4) at a time. During the taking of a pair of these stereo images 3, the respective light source $L_{t+1}$ is switched on so that approximately orthogonal light incidence onto the surface to be imaged 1.1 takes place in the respective imaged area. For each stereo image 3, the respective illumination situation is saved, which contains the information about which light sources $L_k$ were switched on during the taking and, if the light sources can emit different light wavelengths, the wavelength of the light sources $L_k$.

In order to calibrate the system, a defined specimen P which exhibits defined circular marks is imaged once into stereo images 3 using the sensors $S_i$ in step K1 outside of the regular operation. In a calibration step K2, the inner and outer orientations 10 as well as the aberrations 8 of the sensors $S_i$ are determined from these stereo images 3 of the known specimen P. The aberrations can be, for example, distortions, vignettings, color errors and error pixels. From the aberrations 8 transformations are calculated which, if applied to recorded two-dimensional stereo images 3, compensate the aberrations 8 contained in these stereo images 3. Therewith, the calibration is completed. Besides, prepared data of the illumination geometry 7 concerning the position, the direction of emission and the emission cones of the light sources $L_k$ are available from the CAD draft.

In step S2, each stereo image 3 is error corrected using the transformations determined in step K2. Subsequently, individually error corrected stereo images 9 are available. Only with them, analytic formulae can be reasonably used, which determine a 3D ray for each pixel from pixel coordinates and inner and outer orientation 10.

In step S3, geometric parameters according to a given geometric basic body are determined in order to obtain a model 14 for the subsequent calculations. In the example shown in FIG. 6, the matter is about a solid of revolution with radii varying along the symmetry axis. From the silhouettes of the object 1 in error corrected stereo images 9 from different sensors $S_i$, the principal axis of the model 14 as well as a rough preset for the radii of the solid of revolution depending on their position at this axis are determined. The model 14 also obtains the description of a widely regular grid on the surface of the solid of revolution.

The error corrected stereo images 9 are projected onto the model 14. Thus, they become more similar to each other than they are originally. This essentially eases the matching between pairs of stereo images 3 performed later on. The rays of every single pixel are therefore intersected with the model 14. Only one image per sensor $S_i$ is necessary, which can be, on one hand, for example, a linear combination of stereo images 3 from several different illumination situations or, on the other hand, a simple stereo image 3 of the sensor $S_i$ with a particular illumination. In case of five sensors $S_i$, as a result there are five pre-undistorted stereo images 12 available afterwards.

In step S5, the pre-undistorted stereo images 12 are compared to each other at all or at a great many points of two sensors, respectively, in order to determine corresponding points. Reasonably, only the pre-undistorted stereo images 12 from adjacent sensors $S_i$ are matched, so that this process is performed four times in case of five sensors $S_i$. As a result, for each adjacent pair of sensors $S_i$ two-dimensional stereo parallaxes 16 are available. These stereo parallaxes 16 represent for each pixel of the first sensor $S_i$ where to find the same point of the object 1 in the image of the second sensor $S_{i+1}$. In this step of the method, the known HVFM method can be used.

In step S6, height deviations between the model 14 and the surface to be imaged 1.1 are determined. For every discrete point of the surface grid on the model 14 it is checked in the thereto eligible stereo parallaxes 16 if there is an intersection of two corresponding rays along the surface normal in the center of the grid point. This step is known in form of the "Locus" method. As a result, the model 14 is available in the geometry of the surface grid with height deviations 18 parallel to the surface normal in the center of the respective grid point.

In step S7, regarding the current object point, a selection of the best suited error corrected stereo image 9 out of the recorded combinations of sensors $S_i$ and illumination situations or, respectively, out of a selection of the best suited images with subsequent weighting is performed. As criteria, the line of vision of the respective ray to the surface normal, the difference to the respective angle of incidence of the illumination as well as, optionally, the distance between the respective sensor $S_i$ and the surface to be imaged 1.1.

Thereby, the total reflection at the fingerprint ridges and the resolution are optimized. The pixel is projected from the selected error corrected stereo images 9 onto the reconstructed model 14 with height deviations 18.

In order to obtain two-dimensional fingerprints compatible with traditional databases, in step S8a an unrolling of the model 14 on a plane area is simulated subsequently, whereby a two-dimensional image 22 is created which corresponds as much as possible to the unrolling process in the traditional production of the fingerprint. Thereby, it is the matter of a projection of the finger's surface onto the two-dimensional area of the image 22.

Alternatively or additionally, in Step S8b the model 14 with height deviations 18 and the projected surface image 19 is transformed to a 3D texture which can be processed and compared in further steps of the method.

FIG. 3 shows in its partial figures a) and b) an arrangement comprising five sensors $S_i$. Inbetween, a specimen P with defined marks M is placed. The marks are dark on a bright underground, but can also be provided to be bright on a dark underground. The midplanes $E_1$ and $E_2$ of the fields of view of the sensors $S_1$ and $S_2$ are depicted.

In FIG. 4, the stereo images 3 from the sensors $S_1$ and $S_2$ from the taking of the specimen P are illustrated.

FIG. 5 shows the stereo-parallaxes which have been determined from the stereo images 3.

Figure 6A:
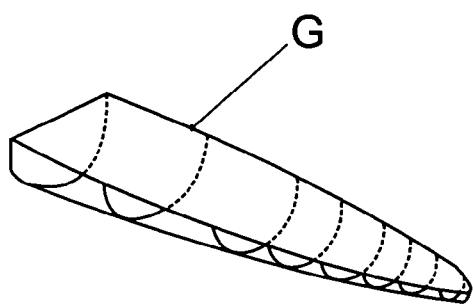
Figure 6B:
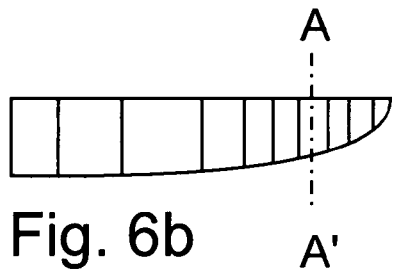

FIG. 6 illustrates in its partial figures a) and b) a basic body G in form of a solid of revolution with varying radii.

Figure 7:
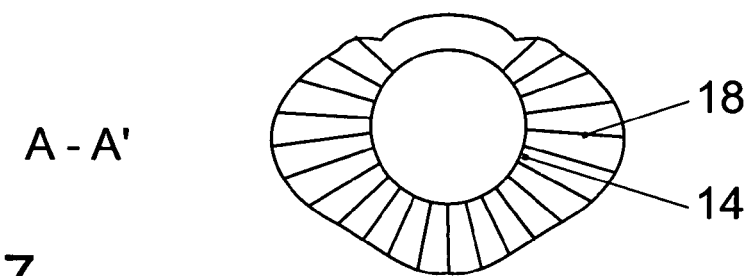

FIG. 7 show a sectional view of a model 14 consisting of the basic body G and height deviations 18 being surface normal thereto.

Figure 8:
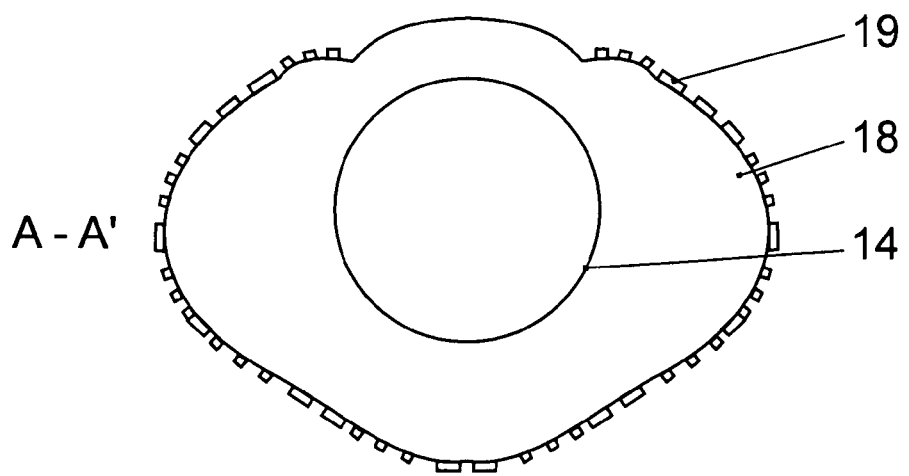

In FIG. 8, the projected surface image 19 is depicted in grayscale on the model 14.

Figure 9:
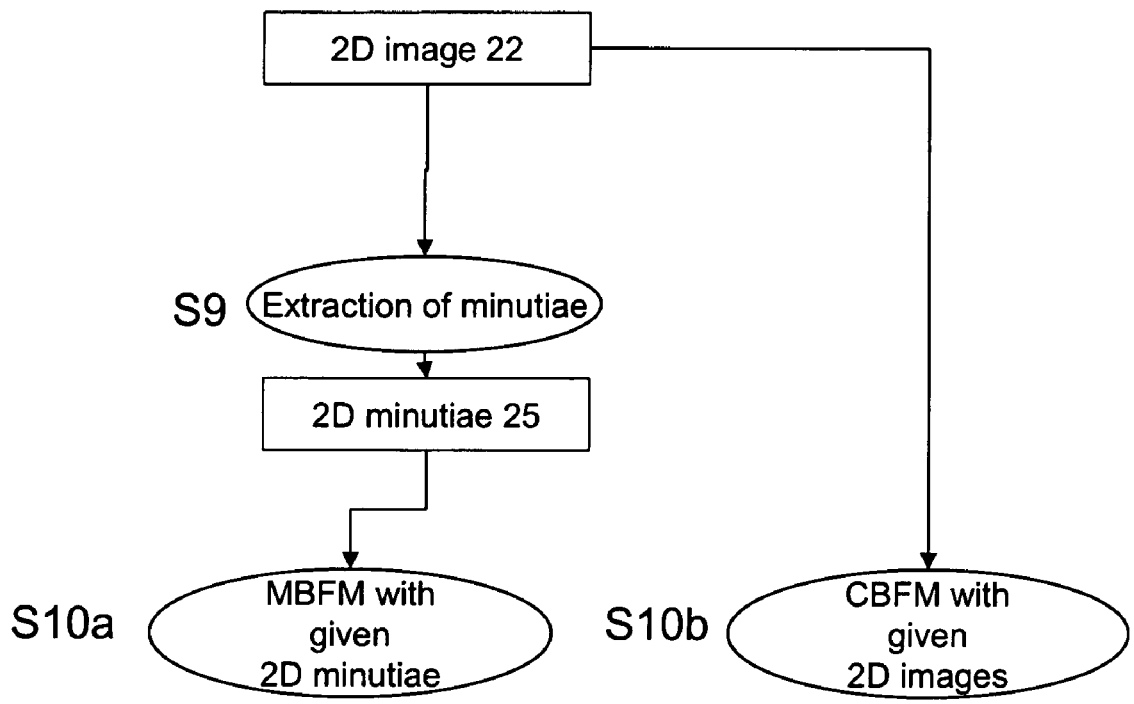

In FIG. 9, further steps of the method are depicted for comparing acquired finger surfaces using correlation based fingerprint matching or minutiae based fingerprint matching respectively, wherein traditional two-dimensional fingerprint representations are used.

Figure 10:
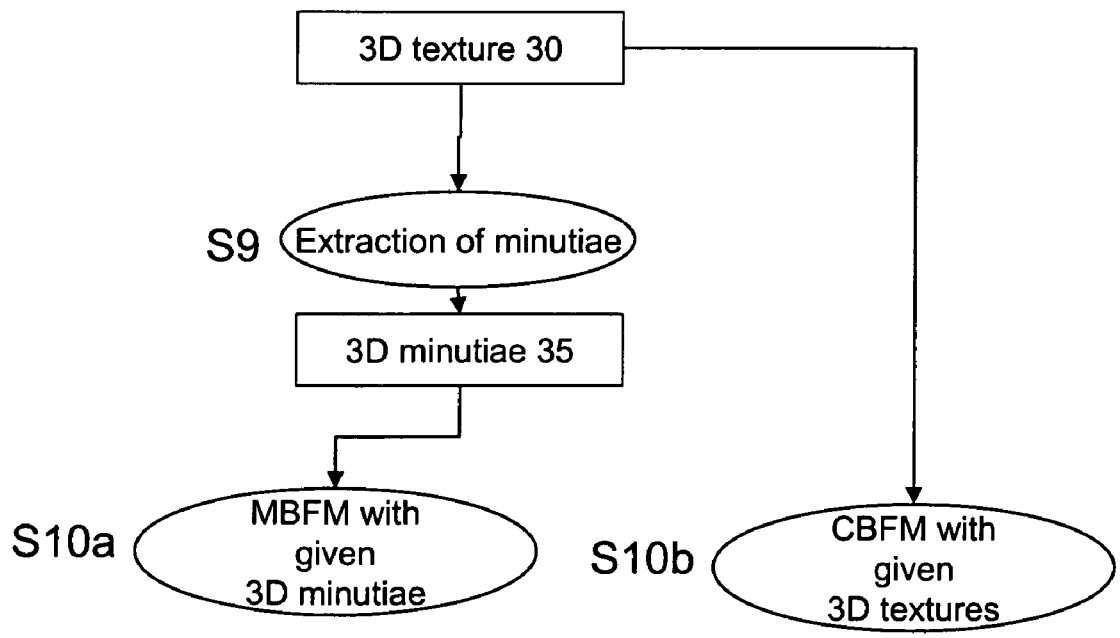

An extension to the three-dimensional case is shown in FIG. 10 in analogous steps of the method.

Figure 11:
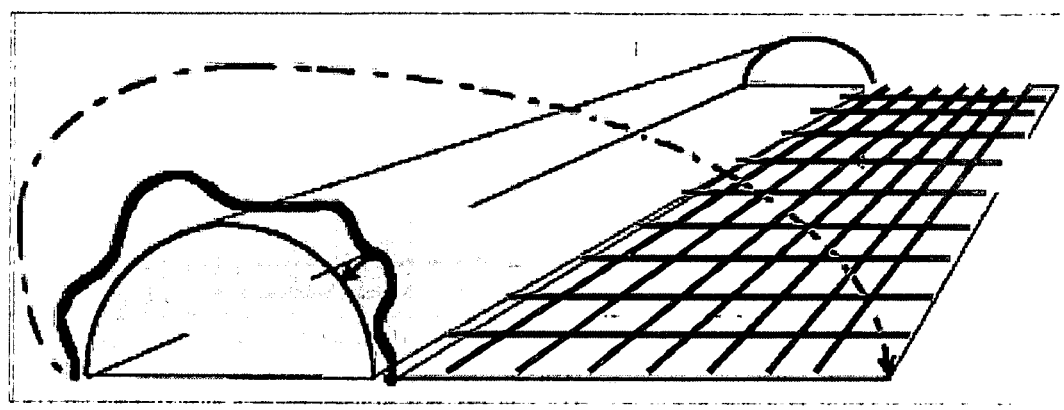

As an example, FIG. 11 shows a half-cylindric profile body for the simulation of the unrolling movement as an orthogonal projection of the surface image 19 onto a curved surface whose coordinates are calculationally converted to a plane area.

Figure 12:
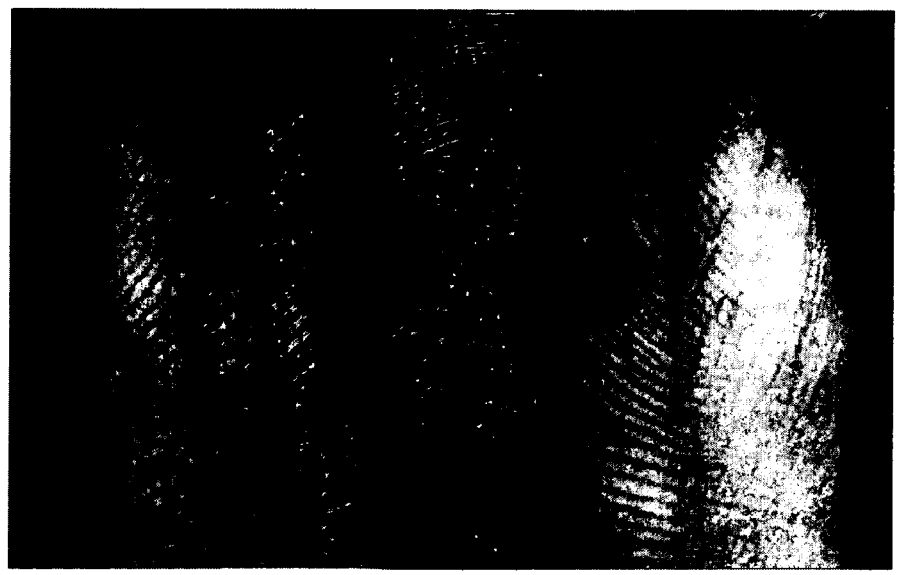

Finally, FIG. 12 shows a result of the unrolling simulation as an example.

The steps of the method which create and compare three-dimensional minutiae and the three-dimensional texture can also be used independently from the other steps of the method with otherwise created three-dimensional images.

What is claimed is:

1. A method for acquiring biometric data of an object comprising:
    acquiring a first digital two-dimensional image of a first set of points on a surface of the object from a first taking direction using a first optical scanning sensor;
    acquiring a second digital two-dimensional image of the first set of points from a second taking direction using a second optical scanner at least approximately simultaneously with the acquiring of the first image;
    calculating a three-dimensional model of the object using the first and second digital two-dimensional images, wherein the calculating is performed using a geometric basic model of the object, the geometric basic model being simplified in comparison to the object, and wherein height deviations between the geometric basic model and the object are determined, the height deviations being orthogonal to a local surface of the geometric basic model;

acquiring a first calibration image of a set of defined points on a surface of a calibration object from the first taking direction using the first optical scanning sensor; and acquiring a second calibration image of the set of defined points from the second taking direction using the second optical scanning sensor at least approximately simultaneously with the acquiring of the first image.

2. A method for acquiring biometric data of an object comprising:

acquiring a first digital two-dimensional image of a first set of points on a surface of the object from a first taking direction using a first optical scanning sensor;

acquiring a second digital two-dimensional image of the first set of points from a second taking direction using a second optical scanner at least approximately simultaneously with the acquiring of the first image;

calculating a three-dimensional model of the object using the first and second digital two-dimensional images;

acquiring a third digital two-dimensional image of a second set of points on a surface of the object from a third taking direction using a third optical scanning sensor, wherein the three-dimensional model includes a model of one of the surface and the image texture of the surface;

acquiring a fourth digital two-dimensional image of the second set of points from a fourth taking direction using a fourth optical scanner at least approximately simultaneously with the acquiring of the third image, and wherein the calculating of the three-dimensional model of the object is performed using the first, second, third, and fourth digital two-dimensional images;

recording the two-dimensional images and determining two-dimensional parallaxes for the stereoscopic analysis from the recorded two-dimensional images; and pre-undistorting the two-dimensional images using a geometric basic model before determining the parallaxes, the geometric base model being simplified in comparison to the object, wherein the object includes a finger, and wherein the basic model includes at least a portion of a solid of revolution, radii of the solid of revolution being approximated to the shape of the finger depending on a position of the radii along an axis of the solid of revolution.

3. The method as recited in claim 2, wherein the axis and the radii of the solid of revolution are calculated using the silhouettes of the finger in two two-dimensional images.

4. The method as recited in claim 2, wherein a Locus method is performed using determined stereo parallaxes, orientations of the sensors and the basic model for determining the basic model.

5. The method as recited in claim 2, wherein further comprising projecting at least one of a grayscale, a color or a multi-spectral image of the surface of the object onto the three-dimensional model.

6. The method as recited in claim 5, further comprising a selecting out of the two-dimensional images is performed individually for each pixel and optimized for extracting minutiae before the projecting onto the model.

7. The method as recited in claim 6, wherein the selecting out of the two-dimensional images is performed using surface normals at a respective object point, inner and outer orientations of the sensors, and at least one of a position, direction of emission and emission cone of light sources.

8. The method as recited in claim 6, further comprising weighting light sources for illumination of a surface pixel depending on an angle between an illuminating ray and a surface normal at the surface pixel before the selecting out, wherein a large weight is assigned to two-dimensional images exhibiting reflectingly incident light at the surface pixel and/or a large weight is assigned to a two-dimensional image having a direction of illumination and line of vision in a vicinity of the normal surface.

9. The method as recited in claim 8, wherein two respective two-dimensional images are used in a weighted combination form for each surface point for the projecting onto the three-dimensional model.

10. A method for acquiring biometric data of an object comprising:

acquiring a first digital two-dimensional image of a first set of points on a surface of the object from a first taking direction using a first optical scanning sensor;

acquiring a second digital two-dimensional image of the first set of points from a second taking direction using a second optical scanner at least approximately simultaneously with the acquiring of the first image;

calculating a three-dimensional model of the object using the first and second digital two-dimensional images;

acquiring a first calibration image of a set of defined points on a surface of a calibration object from the first taking direction using the first optical scanning sensor;

acquiring a second calibration image of the set of defined points from the second taking direction using the second optical scanning sensor at least approximately simultaneously with the acquiring of the first image;

determining an inner and an outer orientation of each of the first and second optical scanning sensors from the first and second calibration images;

calculationally converting the three-dimensional model to a plane area, wherein the calculationally converting the three-dimensional model includes simulating an unrolling movement of a three-dimensional representation and an orthogonal projection of the three-dimensional model onto a profile body and assigning points of the profile body's surface to points of the plane area, and wherein the profile body includes a half cylinder, and wherein a length of an arc of the half cylinder is assigned to a linear coordinate in the plane area.

11. The method as recited in claim 10, wherein the half cylinder exhibits different radii at different locations.

* * * * *